(12) United States Patent
Jeon (10) Patent No.: US 12,365,351 B2
(45) Date of Patent: Jul. 22, 2025

(54) APPARATUS FOR CONTROLLING VEHICLE AND CONTROL METHOD THEREOF

(71) Applicant: HL MANDO CORPORATION, Pyeongtaek-si (KR)

(72) Inventor: Namju Jeon, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 183 days.

(21) Appl. No.: 17/988,131

(22) Filed: Nov. 16, 2022

(65) Prior Publication Data

US 2023/0150521 A1 May 18, 2023

(30) Foreign Application Priority Data

Nov. 16, 2021 (KR) ........................ 10-2021-0157872

(51) Int. Cl.
| | | |
|---|---|---|
| B60W 50/029 | (2012.01) | |
| B60W 10/06 | (2006.01) | |
| B60W 10/184 | (2012.01) | |
| B60W 30/045 | (2012.01) | |
| B60W 30/18 | (2012.01) | |
| B60W 50/02 | (2012.01) | |

(52) U.S. Cl.
CPC .......... B60W 50/029 (2013.01); B60W 10/06 (2013.01); B60W 10/184 (2013.01); B60W 30/045 (2013.01); B60W 30/18172 (2013.01); B60W 50/0205 (2013.01); B60W 2520/14 (2013.01); B60W 2520/26 (2013.01)

(58) Field of Classification Search
CPC .......... B60W 50/029; B60W 50/0205; B60W 50/0225; B60W 10/04; B60W 10/06; B60W 10/18; B60W 10/184; B60W 10/20; B60W 30/045; B60W 30/09; B60W 30/18172; B60W 2520/14; B60W 2520/26; B60W 2710/06; B60W 2710/18; B60W 2720/14; B60W 2720/40; B60W 2720/403; B60W 2720/406; B60W 60/00186; B60W 40/114; B60W 2050/0008; B60W 2050/0012; Y02T 10/72; B62D 15/02; B62D 5/0481

See application file for complete search history.

(56) References Cited

U.S. PATENT DOCUMENTS

| | | |
|---|---|---|
| 9,376,101 B2 | 6/2016 | Goodrich et al. |
| 10,196,086 B2 | 2/2019 | Gupta et al. |
| 2005/0236895 A1* | 10/2005 | Matsumoto ......... B60T 8/17557 303/140 |

(Continued)

FOREIGN PATENT DOCUMENTS

KR  10-2005-0066154 A  6/2005

*Primary Examiner* — Aaron L Troost
(74) *Attorney, Agent, or Firm* — Harvest IP Law, LLP (57) ABSTRACT

A vehicle control apparatus includes a vehicle state sensor, a braking force adjuster, a driving force adjuster, and a controller. When a steering system fails, the controller applies partial braking to the vehicle by providing a braking force to turn-direction inner wheels of the vehicle according to a steering situation to allow the vehicle to turn left or right. The controller also applies compensated driving to the vehicle by providing a compensating driving force corresponding to a reduction in braking force by the partial braking to driving wheels of the vehicle.

8 Claims, 6 Drawing Sheets

(56) References Cited

U.S. PATENT DOCUMENTS

| | | | |
|---|---|---|---|
| 2012/0179349 A1* | 7/2012 | Yamakado | B60W 30/045 |
| | | | 701/89 |
| 2014/0136071 A1* | 5/2014 | Kontz | B60T 8/1755 |
| | | | 701/70 |
| 2023/0121296 A1* | 4/2023 | Labarbera | B60W 10/184 |
| | | | 477/203 |

* cited by examiner

APPARATUS FOR CONTROLLING VEHICLE AND CONTROL METHOD THEREOF

CROSS-REFERENCE TO RELATED APPLICATION

This application is based on and claims priority under 35 U.S.C. § 119 to Korean Patent Application No. 10-2021-0157872, filed on Nov. 16, 2021 in the Korean Intellectual Property Office, the disclosure of which is incorporated herein by reference.

BACKGROUND

1. Field

The present invention relates to a vehicle control apparatus and method that may ensure the steering performance of a vehicle even when a steering system of the vehicle fails.

2. Description of the Related Art

Generally, a steer-by-wire (SBW) system, which is a steering system of a vehicle, is an electrically signaled intelligent steering system that delivers the driver's steering intention as an electrical signal without a mechanical connection between a steering wheel and wheels of the vehicle and performs control accordingly.

For the implementation of the SBW system, a safety measure for a system failure may be the most required technology. While an electric power steering (EPS) system may still enable steering by a force of the driver through a mechanical connection even though there is a failure in an electric system, the SBW system may cause a dangerous state in terms of vehicle safety under the same failure condition, and it is thus important to ensure functional safety for various failure situations.

Conventionally, to ensure safety against such a system failure, dualization of electric/electronic systems such as an electronic control unit (ECU)/sensor/communication/power supply may be applied to enable an immediate switch to a second system in response to a failure in a first system, thereby enabling a continued operation (e.g., fail-operation) even in the failure.

To improve the steering stability of a vehicle, particularly an autonomous vehicle, there is a need for a method that may maintain the steering performance even in a situation where the SBW system fails without the dualization of a system configuration.

SUMMARY

One aspect provides a vehicle control apparatus and method that may ensure the steering stability of a vehicle even in a situation where a steer-by-wire (SBW) system fails, without dualization of a configuration of the SBW system.

According to an aspect, there is provided a vehicle control apparatus including: a vehicle state sensor configured to detect state information of a vehicle; a braking force adjuster configured to adjust a braking force of the vehicle; a driving force adjuster configured to adjust a driving force of the vehicle; and a controller configured to control the braking force adjuster and the driving force adjuster, in which, when a steering system fails, the controller may apply partial braking to the vehicle by providing a partial braking force to turn-direction inner wheels of the vehicle through the braking force adjuster according to a steering situation to allow the vehicle to turn left or right, and may apply compensated driving to the vehicle by providing a compensating driving force corresponding to a reduction in braking force by the partial braking to driving wheels of the vehicle through the driving force adjuster.

The controller may determine a yaw moment of the vehicle based on a yaw rate desired by a driver of the vehicle and an actual yaw rate, and determine the partial braking force to be provided to the turn-direction inner wheels of the vehicle based on the yaw moment The controller may determine the yaw moment of the vehicle based on the yaw rate desired by the driver and the actual yaw rate, and determine the compensating driving force based on the yaw moment.

The controller may determine the yaw moment by adding a first yaw moment for feedforward control of the yaw rate desired by the driver and a second yaw moment for feedback control of a difference between the yaw rate desired by the driver and the actual yaw rate.

The controller may determine a left-turn situation when the yaw rate desired by the driver is greater than a preset yaw rate, and determine a right-turn situation when the yaw rate desired by the driver is less than the preset yaw rate.

The controller may correct the partial braking force to be provided to corresponding wheels to prevent wheel locking of the wheels based on a wheel slip of the wheels to which the partial braking is applied.

According to another aspect, there is provided a vehicle control method including: determining whether a steering system fails; when the steering system fails, applying partial braking to a vehicle by providing a partial braking force to turn-direction inner wheels of the vehicle according to a steering situation to allow the vehicle to turn left or right; and applying compensated driving to the vehicle by providing a compensating driving force corresponding to a reduction in braking force by the partial braking to driving wheels of the vehicle.

The applying the partial braking to the vehicle may include determining a yaw moment of the vehicle based on a yaw rate desired by a driver of the vehicle and an actual yaw rate, and determining the partial braking force to be provided to the turn-direction inner wheels of the vehicle based on the yaw moment.

The applying the compensated driving to the vehicle may include determining the yaw moment of the vehicle based on the yaw rate desired by the driver and the actual yaw rate, and determining the compensating driving force based on the yaw moment.

The determining the yaw moment of the vehicle may include determining the yaw moment by adding a first yaw moment for feedforward control of the yaw rate desired by the driver and a second yaw moment for feedback control of a difference between the yaw rate desired by the driver and the actual yaw rate.

The applying the partial braking to the vehicle may include determining a left-turn situation when the yaw rate desired by the driver is greater than a preset yaw rate, and determining a right-turn situation when the yaw rate desired by the driver is less than the preset yaw rate.

The method may further include correcting the partial braking force to be provided to corresponding wheels to prevent wheel locking of the wheels based on a wheel slip of the wheels to which the partial braking is applied.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Figure 1:
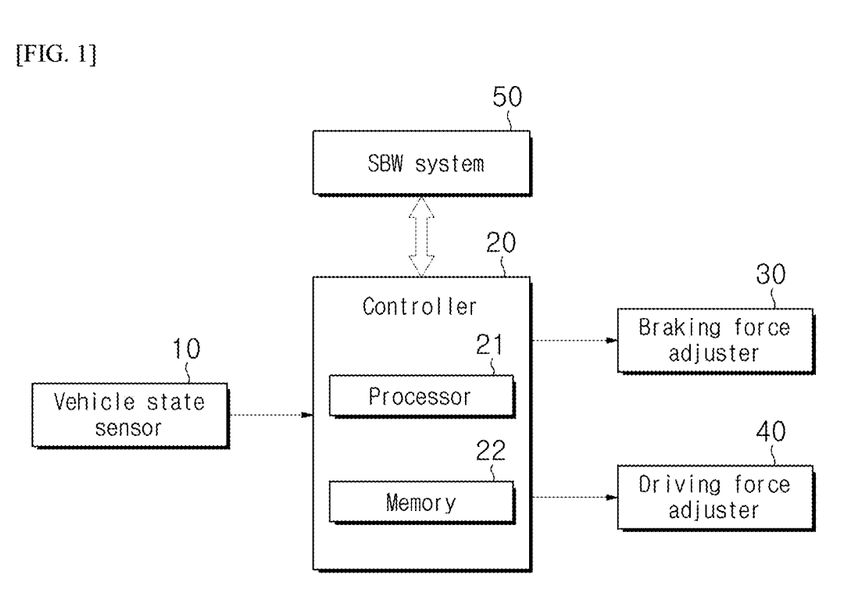
FIG. 1 is a control block diagram illustrating a vehicle control apparatus according to an embodiment.

FIG. 1 is a control block diagram of a vehicle control apparatus according to an embodiment.

Referring to FIG. 1, the vehicle control apparatus may include a vehicle state sensor 10, a controller 20, a braking force adjuster 30, and a driving force adjuster 40.

The vehicle state sensor 10 may be electrically connected to an input side of the controller 20.

The vehicle state sensor 10 may include sensors for detecting vehicle state information of a vehicle, such as, for example, a wheel speed sensor, a yaw rate sensor, or the like. The wheel speed sensor may detect a speed of each wheel of the vehicle. The yaw rate sensor may detect a yaw rate of the vehicle.

The braking force adjuster 30 and the driving force adjuster 40 may be electrically connected to an output side of the controller 20.

The braking force adjuster 30 may adjust a braking force of the vehicle by controlling a braking fluid pressure to be provided to a wheel cylinder of each wheel under the control of the controller 20.

The driving force adjuster 40 may adjust a driving force of the vehicle by controlling a driving torque to be provided to driving wheels of the vehicle under the control of the controller 20.

The vehicle control apparatus may perform control in cooperation with an electronic brake system having a function of the braking force adjuster 30 and an engine control system having a function of the driving force adjuster 40, and the like, rather than including therein the braking force adjuster 30 and the driving force adjuster 40.

The controller 20 may be connected to a steer-by-wire (SBW) system 50 over a network to communicate therewith. The controller 20 may receive failure information of the SBW system 50 from the SBW system 50 or another system mounted on the vehicle.

The controller 20 may include a processor 21 and a memory 22.

The controller 20 may include one or more processors 21. The one or more processors 21 included in the controller 20 may be integrated into a single chip or may be physically separated. In addition, the processor 21 and the memory 22 may be implemented in a single chip.

The processor 21 may process the vehicle state information of the vehicle state sensor 10. In addition, the processor 21 may generate a braking signal for controlling the braking force adjuster 30 and a driving signal for controlling the driving force adjuster 40. For example, the processor 21 may include a digital signal processor configured to process the vehicle state information of the vehicle state sensor 10, and may include a microcontroller unit (MCU) configured to generate the braking signal and the driving signal.

The memory 22 may store programs and/or data for the processor 21 to process the vehicle state information. The memory 22 may also store programs and/or data for the processor 21 to generate control signals relating to a configuration of the vehicle.

The memory 22 may temporarily store the vehicle state information detected by the vehicle state sensor 10. The memory 22 may also temporarily store a result of processing the vehicle state information by the processor 21. The memory 22 may include a volatile memory such as a static random-access memory (SRAM) and a dynamic random-access memory (DRAM), and also a non-volatile memory such as a flash memory, a read-only memory (ROM), an erasable programmable (ROM) (EPROM).

Figure 2:
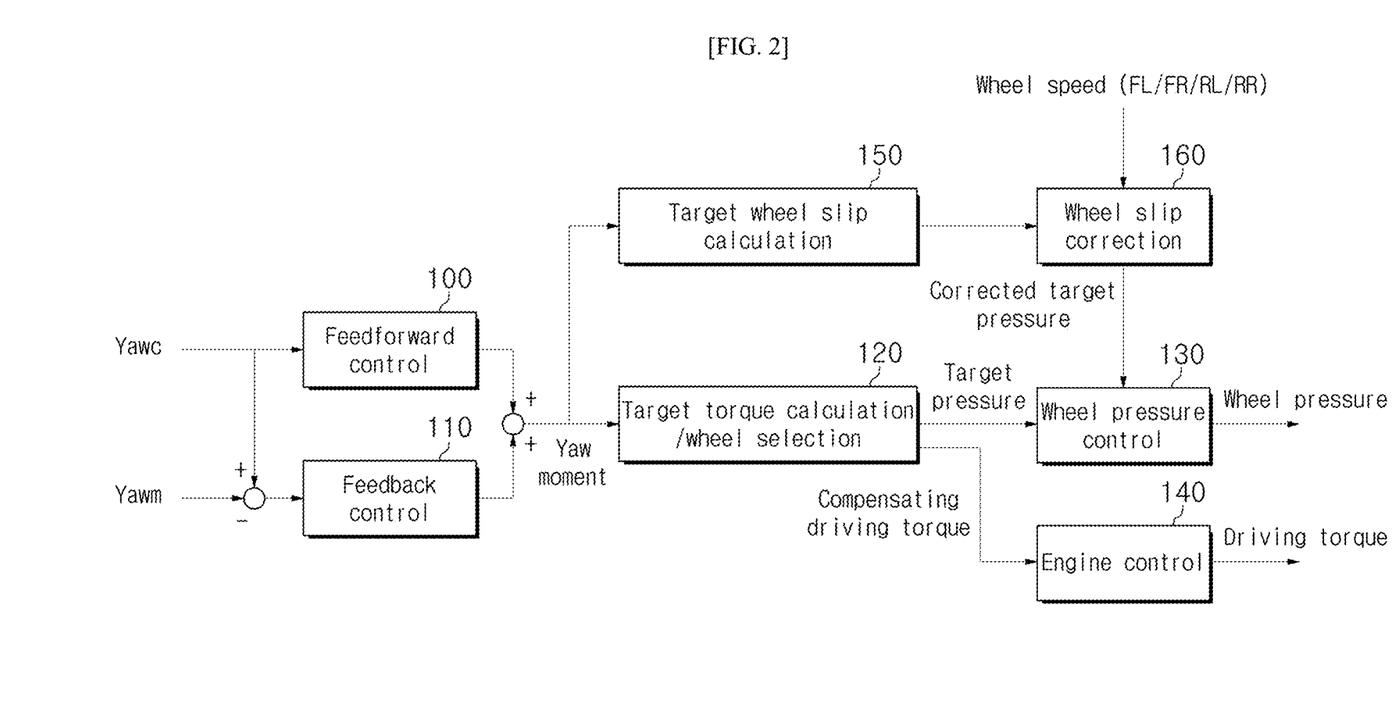
FIG. 2 is a diagram illustrating an example of ensuring the steering performance in the case of a failure in a steer-by-wire (SBW) system by a vehicle control apparatus according to an embodiment.

FIG. 2 is a diagram illustrating an example of ensuring the steering performance in the case of a failure in an SBW system by a vehicle control apparatus according to an embodiment.

Referring to FIG. 2, the controller 20 may secure the steering performance by using partial braking control and additional driving force control when the SBW system fails.

The controller 20 may include a feedforward control block 100, a feedback control block 110, a target torque calculation/wheel selection block 120, a wheel pressure control block 130, and an engine control block 140.

When a yaw rate Yawc desired by the driver is input, the feedforward control block 100 may calculate and output a first yaw moment (Yawc*Pgain_FF, where Pgain_FF is a feedforward P gain) according to feedforward control.

When a difference between the yaw rate Yawc desired by the driver and an actual yaw rate Yawm (or a yaw rate detected by the yaw rate sensor) is input, the feedback control block 110 may calculate and output a second yaw moment ((Yawc−Yawm)×Pgain_FB+∫(Yawac−Yawm))×Igain_FB, where Pgain_FB is a feedback P gain and Igain_FB is a feedback I gain) according to feedback control.

The target torque calculation/wheel selection block 120 may calculate a target pressure for partial braking based on the yaw moment obtained by adding the first yaw moment and the second yaw moment, and may select a wheel to which the partial braking is applied from among wheels according to whether a turn is a left turn or a right turn. The target pressure may be a pressure corresponding to the yaw moment.

The target torque calculation/wheel selection block 120 may calculate a compensating driving torque for compensating for a reduction in braking force caused by the partial braking, based on the yaw moment obtained by adding the first yaw moment and the second yaw moment.

When information such as the target pressure output from the target torque calculation/wheel selection block 120 is input, the wheel pressure control block 130 may perform wheel pressure control according to the target pressure to provide a wheel pressure to the wheel to which the partial braking is applied, thereby applying the partial braking to the vehicle.

When the compensating driving torque output from the target torque calculation/wheel selection block 120 is input when the vehicle is partially braked, the engine control block 140 may perform engine control according to the compensating driving torque to provide a driving torque to a driving wheel, thereby additionally driving the vehicle.

The controller 20 may further include a target wheel slip calculation block 150 and a wheel slip correction block 160.

When the vehicle is partially braked, the target wheel slip calculation block 150 may calculate a target wheel slip based on the yaw moment obtained by adding the first yaw moment and the second yaw moment.

The wheel slip correction block 160 may receive the target wheel slip calculated by the target wheel slip calculation block 150, and output, to the wheel pressure control block 130, a corrected target pressure obtained by correcting a target pressure according to the partial braking on a corresponding wheel to prevent wheel locking of the wheel when a wheel slip of the wheel increases by the partial braking on a low-friction road. The wheel to be controlled may be determined from the yaw moment. Accordingly, the wheel pressure control block 130 may control the wheel pressure of the corresponding wheel according to the provided corrected target pressure.

Figure 3:
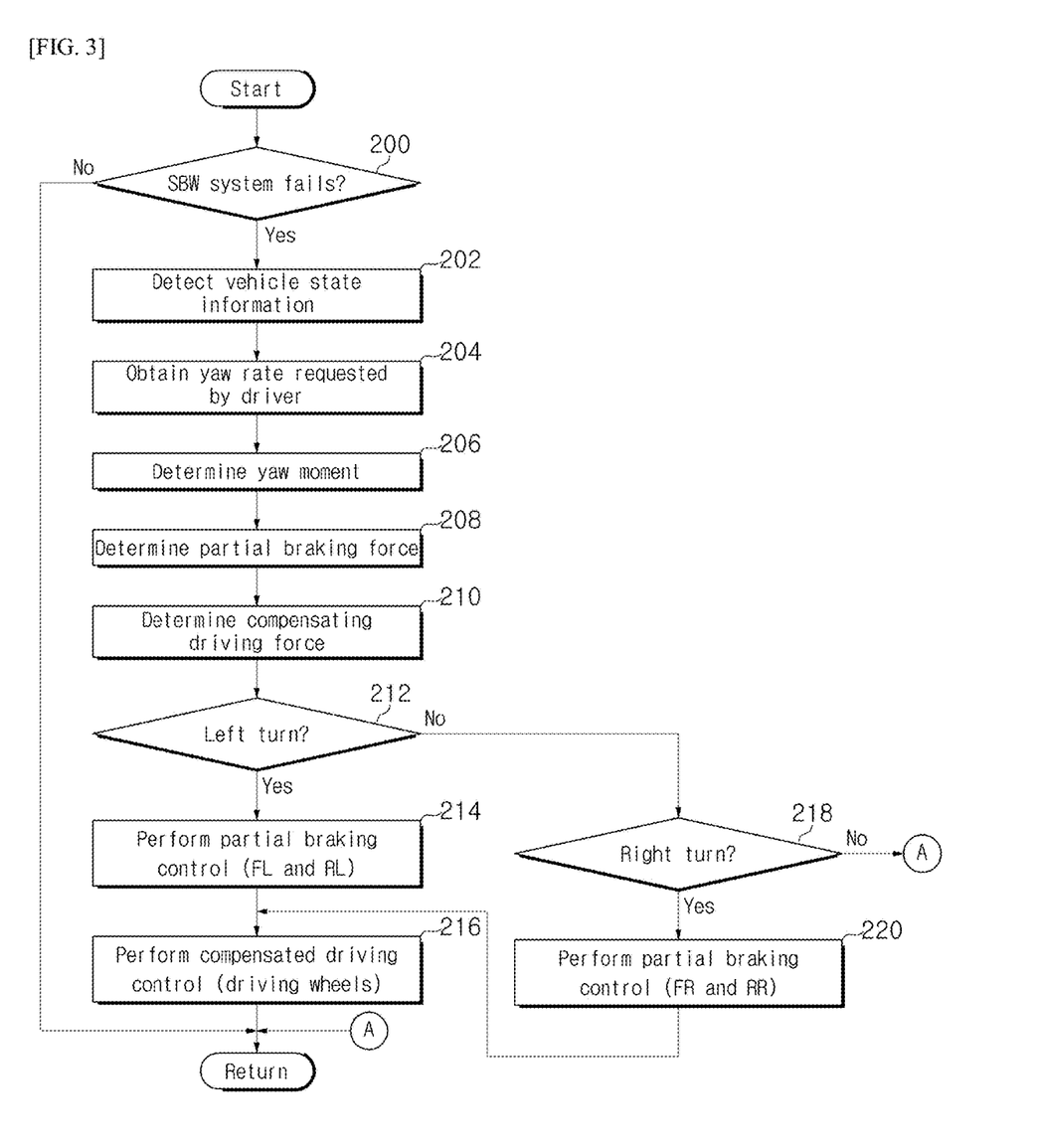
FIG. 3 is a control flowchart illustrating a vehicle control method according to an embodiment.

FIG. 3 is a control flowchart illustrating a vehicle control method according to an embodiment.

Referring to FIG. 3, in operation 200, the controller 20 may determine whether the SBW system 50 fails.

In operation 202, when it is determined that the SBW system 50 fails (YES in operation 200), the controller 20 may detect vehicle state information through the vehicle state sensor 110.

In operation 204, the controller 20 may obtain a yaw rate desired by the driver (e.g., a yaw rate requested by the driver). The yaw rate desired by the driver may be obtained from a vehicle model based on a vehicle behavior or from another system of the vehicle.

In operation 206, the controller 20 may determine a yaw moment of the vehicle required for a turn of the vehicle, based on an actual yaw rate of the vehicle state information and the yaw rate desired by the driver.

In operation 208, the controller 20 may determine a partial braking force required for partial braking, based on the yaw moment of the vehicle.

In operation 210, the controller 20 may determine a compensating driving force for compensating for a reduction in braking force by the partial braking, based on the yaw moment of the vehicle.

In operation 212, the controller 20 may determine whether the vehicle is in a left-turn situation by comparing the yaw rate desired by the driver and a preset yaw rate.

When it is determined that the vehicle is in the left-turn situation (YES in operation 212), the controller 20 may perform partial braking control for the partial braking by providing the partial braking force to left front and rear wheels FL and RL.

In operation 216, the controller 20 may also perform compensated driving control for driving by providing the compensating driving force to driving wheels FL and FR to compensate for the reduction in braking force by the partial braking control.

In operation 218, when it is determined that the vehicle is not in the left-turn situation (NO in operation 212), the controller 20 may determine whether the vehicle is in a right-turn situation.

In operation 220, when it is determined that the vehicle is the right-turn situation (YES in operation 218), the controller 20 may perform the partial braking control for the partial braking by providing the partial braking force to right front and rear wheels FR and RR.

In operation 216, the controller 20 may also perform the compensated driving control for driving by providing the compensating driving force to driving wheels FL and FR to compensate for the reduction in braking force by the partial braking control.

Figure 4:
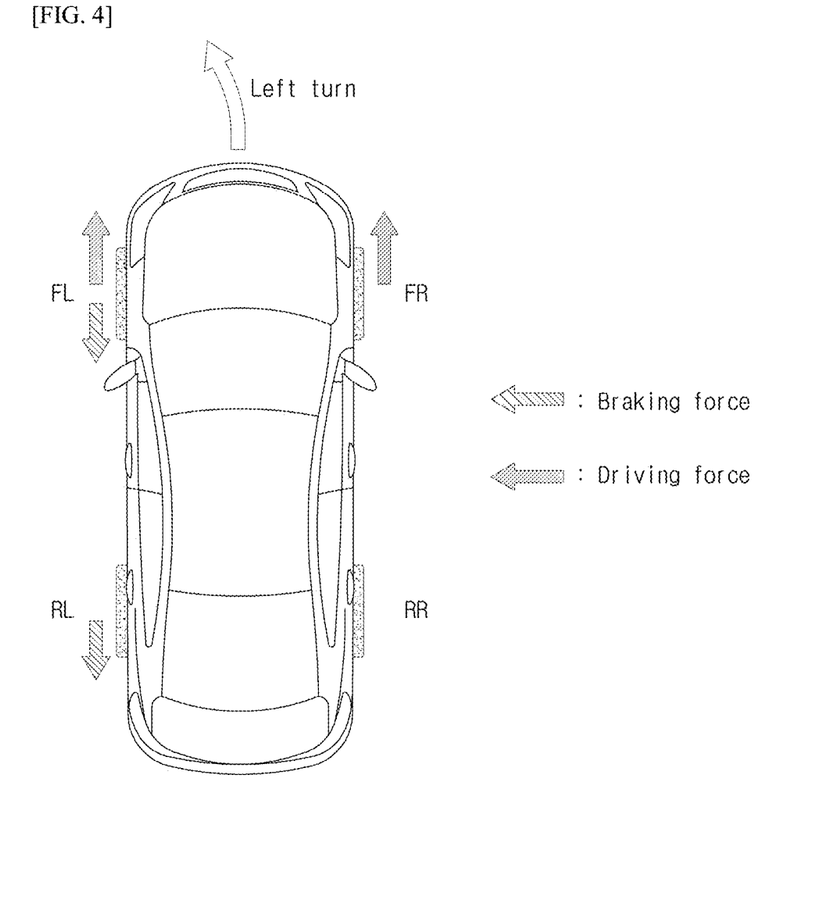
FIG. 4 is a diagram illustrating an example of a vehicle turning left through partial braking control and compensated driving control by a vehicle control apparatus according to an embodiment.
Figure 5:
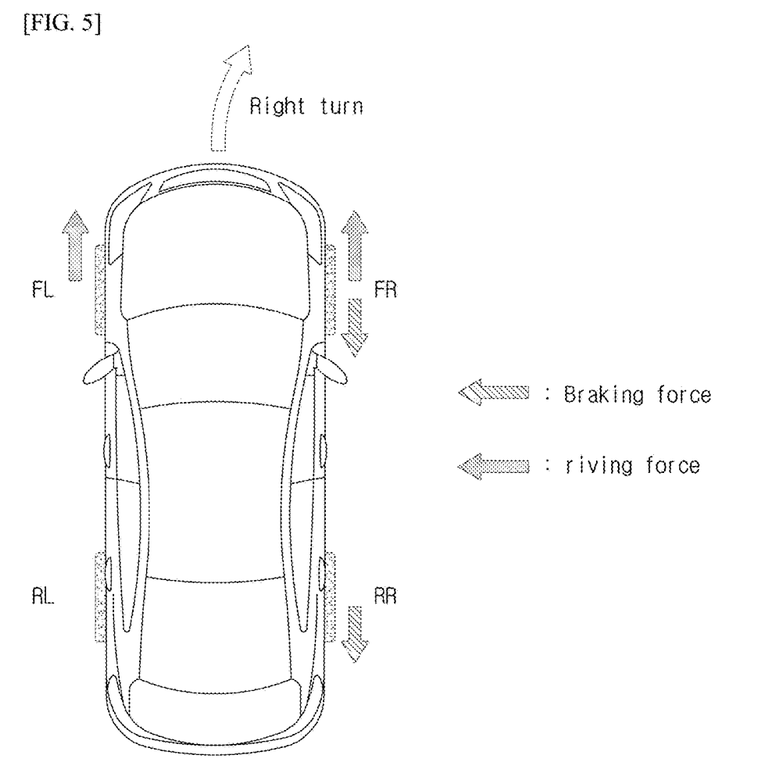
FIG. 5 is a diagram illustrating an example of a vehicle turning right through partial braking control and compensated driving control by a vehicle control apparatus according to an embodiment.

FIG. 4 is a diagram illustrating an example of a vehicle turning left through partial braking control and compensated driving control by a vehicle control apparatus according to an embodiment, and FIG. 5 is a diagram illustrating an example of a vehicle turning right through partial braking control and compensated driving control by a vehicle control apparatus according to an embodiment.

Referring to FIGS. 4 and 5, when a steering situation corresponds to a left turn of the vehicle (e.g., an autonomous vehicle) in a situation where the SBW system fails, a braking force may be applied to left front and rear wheels FL and RL which are left turn-direction inner wheels, and the vehicle may thereby be partially braked to shift a direction to the left.

When the steering situation corresponds to a right turn of the vehicle, the braking force may be applied to right front and rear wheels FR and RR which are right turn-direction inner wheels, and the vehicle may thereby be partially braked to shift a direction to the right.

Therefore, it is possible to ensure the steering stability of the vehicle even in a situation where the SBW system fails without dualization of a configuration of the SBW system.

On the other hand, when the braking force is applied to the left front and rear wheels FL and RL for the left turn, a braking force loss may occur. To compensate for this loss, a driving force may be applied to the left and right front wheels FF and FR which are driving wheels (e.g., FF and FR in the case of a front-wheel drive vehicle) to drive the vehicle. In the case of an internal combustion engine vehicle, an engine may be driven to provide the driving force to the left and right front wheels FF and FR. In the case of an electric vehicle, a driving motor may be driven to provide the driving force to the left and right front wheels FF and FR.

Therefore, it is possible to ensure the steering stability of the vehicle while minimizing the braking force loss even in a situation where the SBW system fails.

Figure 6A:
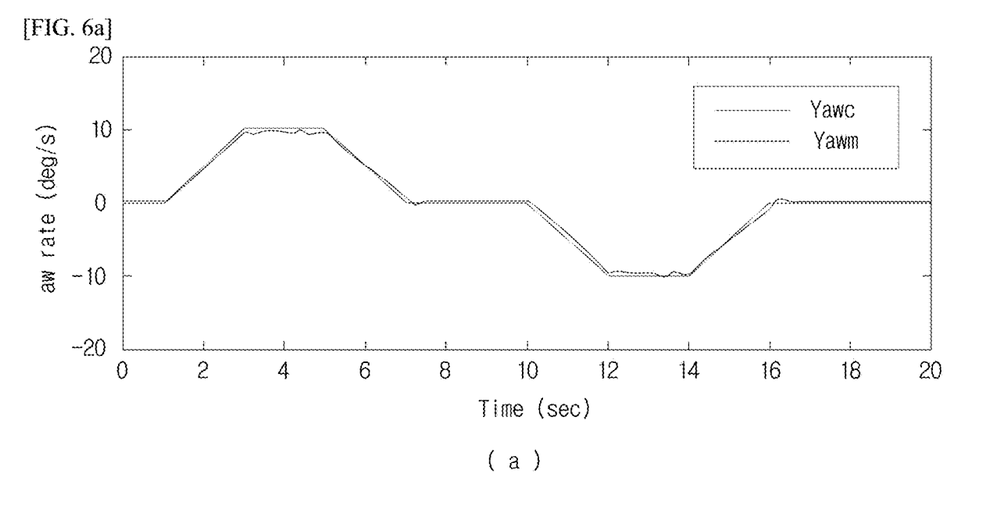
FIGS. 6a, 6b and 6c are a graph illustrating an example of performing partial braking control of a vehicle control method according to an embodiment.
Figure 6B:
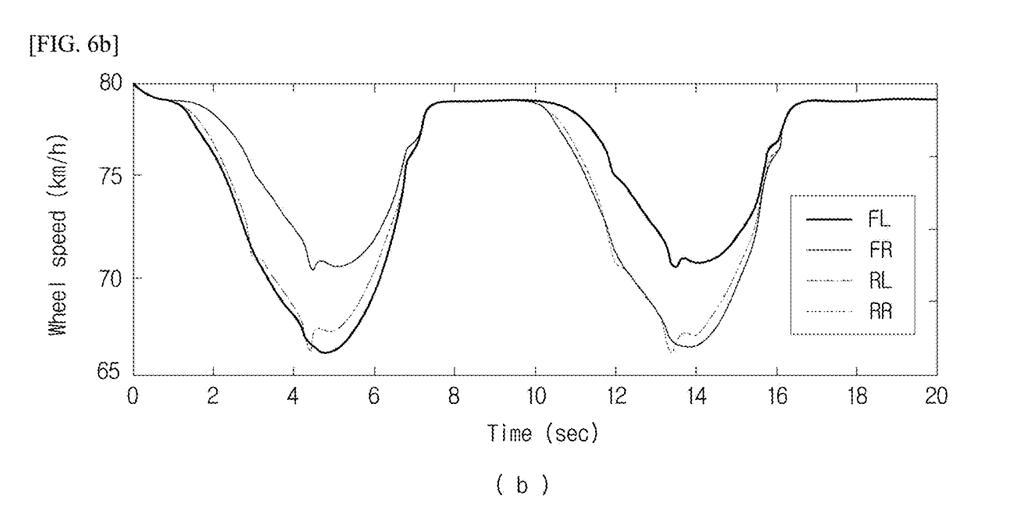
Figure 6C:
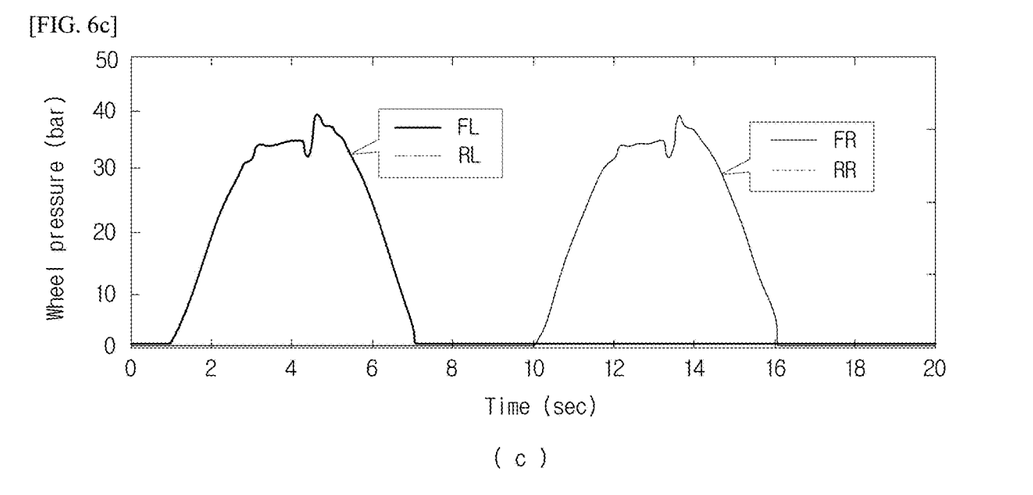

FIGS. 6a, 6b and 6c are a graph illustrating an example of performing partial braking control of a vehicle control method according to an embodiment.

Referring to FIGS. 6a, 6b and 6c, illustrated are left-turn and right-turn situations where a vehicle turns left and turns right while traveling at a speed of 80 km/h.

In the left-turn situation where a yaw rate Yawc desired by a driver of the vehicle is greater than zero (e.g., Yawc>0), a wheel pressure may be applied only to left front and rear wheels FL and RL to partially brake the vehicle. In this case, the same wheel pressure may be provided to the left front and rear wheels FL and RL. The vehicle may thus switch the direction to the left. When the vehicle switches from the left turn to straight, the wheel pressure provided only to the left front and rear wheels FL and RL may be released, and the vehicle may thus switch to face straight.

In the right-turn situation where the yaw rate Yawc desired by the driver is less than zero (e.g., Yawc<0), the wheel pressure may be applied only to right front and rear wheels FR and RR to partially brake the vehicle. In this case, the same wheel pressure may be provided to the right front and rear wheels FR and RR. The vehicle may thus switch the direction to the right. When the vehicle switches from the right turn to straight, the wheel pressure provided only to the right front and rear wheels FR and RR may be released, and the vehicle may thus switch to face straight.

As described above, according to an embodiment, partial braking control may be used in a situation where the SBW system fails, to ensure the steering stability of the vehicle without the dualization of the configuration of the SBW system. In addition to the partial braking control to ensure the steering stability of the vehicle, compensated driving control may be used to compensate for a driving force corresponding to a shortage of braking force due to the partial braking control, and it is thereby possible to minimize the shortage of braking force while ensuring the steering stability of the vehicle. Further, in addition to the partial braking control to ensure the steering stability of the vehicle, wheel slip correction control may be used to prevent wheel locking on a low-friction road.

According to an embodiment, it is possible to ensure the steering stability of the vehicle even in a situation where the SBW system fails, without the dualization of the configuration of the SBW system.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

The invention claimed is:

1. A vehicle control apparatus, comprising:
a vehicle state sensor comprising at least one sensor physically implemented to detect state information of a vehicle,
a controller including a processor and a memory;
the memory storing one or more programs configured to be executed by the processor, the one or more programs including instructions for:

determining whether a steering system fails based on the state information;

when it is determined that the steering system fails, determining a yaw moment of the vehicle based on a yaw rate desired by a driver of the vehicle and an actual yaw rate;

when it is determined that the steering system fails, generating a control signal to apply partial braking to the vehicle by providing a partial braking force to turn-direction inner wheels of the vehicle according to a steering situation to allow the vehicle to turn left or right, and when it is determined that the steering system fails, generating a control signal to apply compensated driving to the vehicle by providing a compensating driving force to driving wheels of the vehicle, wherein the partial braking force to be provided to the turn-direction inner wheels of the vehicle is determined based on the yaw moment, wherein the compensating driving force is determined based on both (1) a reduction in braking force by the determined partial braking force and (ii) the yaw moment, wherein the one or more programs include instructions for:

determining the yaw moment by adding a first yaw moment for feedforward control of the yaw rate desired by the driver and a second yaw moment for feedback control of a difference between the yaw rate desired by the driver and the actual yaw rate.

2. The vehicle control apparatus of claim 1, wherein the one or more programs include instruction for:

determining a left-turn situation when a yaw rate desired by a driver of the vehicle is greater than a preset yaw rate, and determining a right-turn situation when the yaw rate desired by the driver is less than the preset yaw rate.

3. The vehicle control apparatus of claim 1, wherein the one or more programs include instruction for:

correcting the partial braking force to be provided to corresponding wheels to prevent wheel locking of the wheels based on a wheel slip of the wheels to which the partial braking is applied.

4. The vehicle control apparatus of claim 3, wherein the one or more programs includes instructions for:

calculating a target wheel slip based on the yaw moment, wherein the partial braking force is corrected based on the calculated target wheel slip.

5. The vehicle control apparatus of claim 4, wherein the partial braking force is corrected based on whether the wheel slip of the wheel increases due to a road condition.

6. A vehicle control method, comprising:

determining whether a steering system fails;

when the steering system fails, determining a yaw moment of the vehicle based on a yaw rate desired by a driver of the vehicle and an actual yaw rate;

when the steering system fails, applying partial braking to a vehicle by providing a partial braking force to turn-direction inner wheels of the vehicle according to a steering situation to allow the vehicle to turn left or right; and when the steering system fails, applying compensated driving to the vehicle by providing a compensating driving force to driving wheels of the vehicle, wherein the partial braking force to be provided to the turn-direction inner wheels of the vehicle is determined based on the yaw moment, wherein the compensating driving force is determined based on both (i) a reduction in braking force by the determined partial braking force and (ii) the yaw moment, wherein the determining the yaw moment of the vehicle comprises:

determining the yaw moment by adding a first yaw moment for feedforward control of the yaw rate desired by the driver and a second yaw moment for feedback control of a difference between the yaw rate desired by the driver and the actual yaw rate.

7. The vehicle control method of claim 6, wherein the applying the partial braking to the vehicle comprises:

determining a left-turn situation when the yaw rate desired by the driver is greater than a preset yaw rate, and determining a right-turn situation when the yaw rate desired by the driver is less than the preset yaw rate.

8. The vehicle control method of claim 6, further comprising: correcting the partial braking force to be provided to corresponding wheels to prevent wheel locking of the wheels based on a wheel slip of the wheels to which the partial braking is applied.

* * * * *